L. J. SCHNELL.
LOCK NUT.
APPLICATION FILED NOV. 26, 1919.

1,352,090.

Patented Sept. 7, 1920.

INVENTOR
LAWRENCE J. SCHNELL.
BY
Edward B. Birkenhead
ATTORNEY

UNITED STATES PATENT OFFICE.

LAWRENCE J. SCHNELL, OF PORTLAND, OREGON.

LOCK-NUT.

1,352,090.  Specification of Letters Patent.  Patented Sept. 7, 1920.

Application filed November 26, 1919. Serial No. 340,892.

*To all whom it may concern:*

Be it hereby known that I, LAWRENCE J. SCHNELL, a citizen of the country of Russia, (who has declared his intention of becoming a citizen of the United States,) and a resident of Portland, in the county of Multnomah and State of Oregon, have invented a new and useful Lock-Nut, of which the following is a specification.

My invention relates more particularly to a means for preventing the rotation in one direction of a nut upon its bolt.

The object of my invention is to provide an exceedingly simple and efficient lock nut which is capable of being locked or unlocked by a simple movement of a pin.

Figure 1:
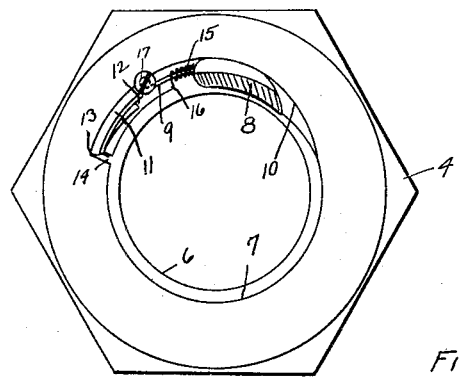
Figure 2:
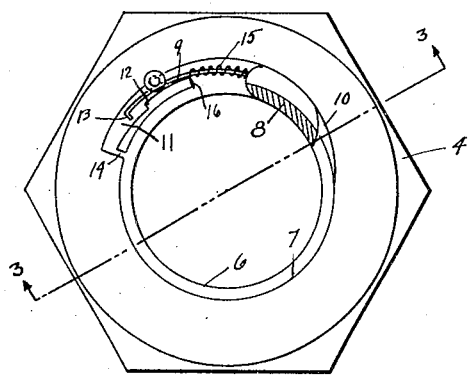
Figure 3:
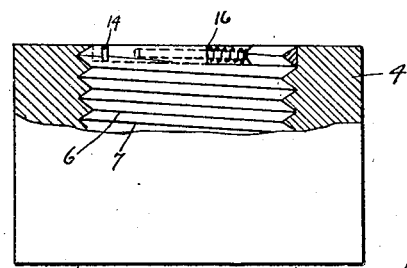

It attain these objects in the manner set forth in the specifications following and illustrated in the accompanying drawing, in which: Figure 1 is a plan of a nut showing the device in the unlocked position; Fig. 2 is similar to Fig. 1 except in the locked position; Fig. 3 is an elevation with a portion broken away to show the working parts of my device along the line 3—3 in Fig. 2.

Similar numbers of reference refer to the same or similar parts throughout the several views.

Referring in detail to the drawing: The numeral 4 represents the usual hexagonal head nut mounted on the bolt 5. The smallest internal diameter of the nut 4 is represented by the numeral 6 and the root of the thread as 7. A short section of thread 8 is attached to a curved wire 9 and is adapted to be wedged against the curved surface 10 and the root of the thread of the bolt 5. A channel 11 is formed in the nut 4 in a manner to receive the curved wire 9 whose bent end 13 may be latched in the recess 14 at the end of the channel 9 or the recess 12. A spring 15 mounted on the wire 9 and bearing on the end 16 of the interior wall of the channel 9 tends to hold the section of thread 8 into a wedged position. Retaining screw 17 serves to hold the wire 9 in place.

The operation of my device is as follows: When it is not desired to use the nut as a locked nut the bent end 13 is latched into the recess which holds the spring 15 in compression and the wedging member 8 out of contact with the bolt 5 as shown in Fig. 1.

When it is desired to use it as a lock nut the end 13 is unlatched from the recess 14 and takes the position shown in Fig. 2. Any movement of the bolt 5 in a clockwise direction in Fig. 2 causes the threads of the bolt 5 to engage the roughened surface of the wedge member 8, which has the form of a thread, to be wedged between the surface 10 and the bolt member 5. The recess 12 serves to hold the bent end 13 of the wire 9 when the nut 4 is not attached to a bolt.

It will be evident that the greater the strain placed on the nut 4 the greater the wedging action against the member 8 and no damage to the threads can result therefrom, inasmuch as the strain is delivered to the root of the thread instead of at its point.

While I have thus illustrated and described my invention it is not my desire to limit myself to this precise form or method of application, but intend that it shall cover all forms and modifications that fall fairly within the appended claims.

What I claim as new and desire to protect by Letters Patent of the United States, is:

1. A lock nut having a portion of one thread cut away and a sliding section of thread put in its place in a manner that rotation of the nut in one direction will wedge said section of thread between the nut and the bolt, and a reverse rotation will carry said thread out of its wedging position.

2. A lock nut having a curved recess formed in a face of said nut with its curved portion forming a tangent with the root of said thread in said nut, a curved wall formed on the side of said recess adjacent to the thread, a section of thread adapted to be wedged between said curved side of the recess and the bolt member, a wire slide for said wedge and attached thereto, a coil spring member mounted on said wire slide and adapted to force said wedge member into a wedging position, a means for holding said wedge member out of position consisting of a bent end on said wire slide, and a recess in said nut adapted to receive said bent end, a means for preventing the escape of said wire member when the nut is not on a bolt, consisting of a second recess in said bolt positioned to engage said bent end after it has been released from its aforesaid position, a means for preventing the escape of said wedge member and its slide and spring, consisting of a counter sunk bolt whose head is adapted to cover a portion of said wire slide member.

3. A locking device for nuts consisting of a wedge adapted to be held between a recess in the nut member and the root of the thread on its bolt member, a wire slide means adapted to guide and retain said wedge member, a bent end on said wire slide member, and a spring adapted to hold said wedge member into engagement with the bolt member.

LAWRENCE J. SCHNELL.